Feb. 27, 1923.
W. BARTHOLOMEW
TOOL
Filed Jan. 25, 1918
1,446,444
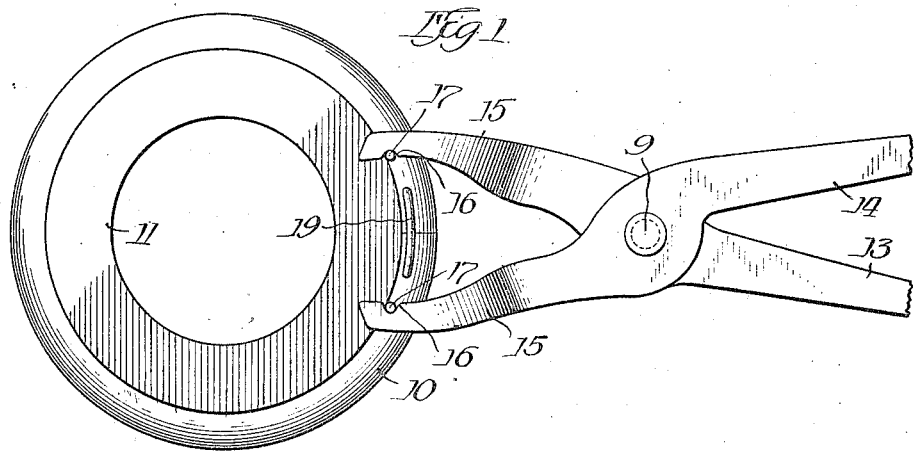
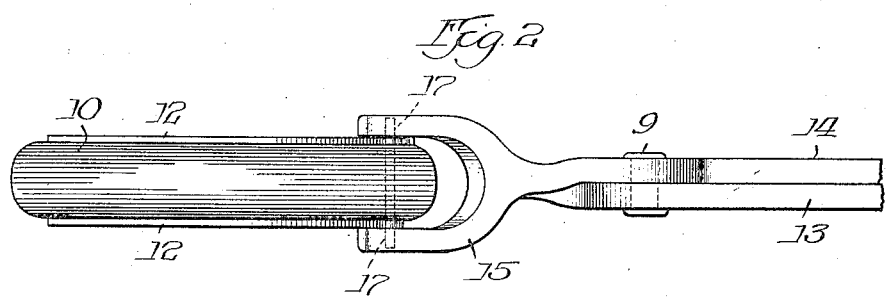
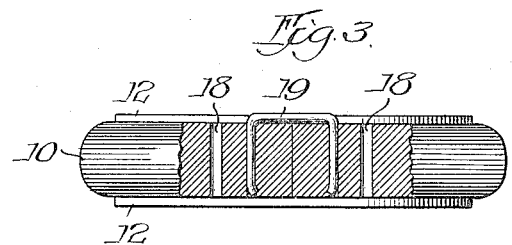

Patented Feb. 27, 1923.

1,446,444

UNITED STATES PATENT OFFICE.

WILLIAM BARTHOLOMEW, OF CHICAGO, ILLINOIS, ASSIGNOR TO TROY LAUNDRY MACHINERY CO., LTD., OF CHICAGO, ILLINOIS, A CORPORATION OF NEW YORK.

TOOL.

Application filed January 25, 1918. Serial No. 213,794.

*To all whom it may concern:*

Be it known that I, WILLIAM BARTHOLOMEW, a citizen of the United States, and resident of Chicago, in the county of Cook and State of Illinois, have invented certain new and useful Improvements in Tools, of which the following is a specification.

This invention relates to a tool for drawing together the ends of a yieldable member, whereby said ends may be secured to each other.

One of the objects of this invention is to facilitate drawing together the ends of an elastic or yieldable member whereby said ends may be joined or otherwise secured to each other.

Another object of the invention is to provide a tool particularly adapted to perform the function above noted.

Generally speaking these and other objects are accomplished by providing a tool comprising a plurality of bifurcated members pivotally connected to each other and having engaging portions whereby material may be treated in a manner to fasten together parts thereof.

The invention is illustrated on the accompanying sheet of drawings, in which.

Figure 1 is a plan view of my improved tool, shown as being employed in the performance of its function.

Figure 2 is a side elevation of the same, and

Figure 3 is a side elevation, parts being in section, showing the means for connecting the ends of the elastic member.

The yieldable or elastic member 10 may be a tire, cushioning element or shock absorbing member, which is mounted over and around a collar 11, having side retaining flanges 12. In order that this member 10 may be of practical service, the same must be under tension or in a stretched state. Therefore, in order to apply the elastic member to the collar 11 in such a manner that the ends thereof meet, said ends must be drawn together by some suitable means.

To accomplish this result I have provided a tool including two members 13 and 14, pivotally connected to each other by a pin 9, preferably intermediate their ends. One end 15 of each of the pivotally connected members 13 and 14 is bifurcated or fork-shaped to straddle the elastic member 10. On the inner edges near the end of each arm of the bifurcated portions 15 there is provided a notch 16, for the reception of the ends of pins 17, which are driven through the elastic member to facilitate bringing together the ends thereof.

As shown in Fig. 3, openings 18 are provided for the reception of the pins, it being understood, of course, that the elastic member 10 is not necessarily rubber, but may be of any material having a reasonable degree of elasticity.

In applying the elastic member to the collar 11, the jaw or the bifurcated ends of the tool are opened or spread apart in a manner whereby the notches 16 may receive the pins 17, whereupon the jaws are brought toward each other, thereby drawing together the ends of the elastic. As soon as the ends of the elastic are pressed into engagement with each other, the staple 19 is drawn in place and the tool withdrawn. The pins 17 then may be withdrawn whereupon the completed article is ready for use.

It will be appreciated that instead of providing notches in the bifurcated portions of the tool, other means may be provided for positively holding the pins without slipping. There may be various modifications made in the detail of construction, and it is my intention to cover all such modifications coming within the spirit and scope of the following claims.

I claim:

Apparatus for drawing together the ends of an elongated member to form a band, said apparatus comprising two pins adapted to be inserted through corresponding holes, each of which is located near an end of said member, and a clamping member having a pair of bifurcated jaws, the bifurcations of each of said jaws being adapted to grip the two opposite ends of its corresponding pin, whereby the ends of said member may be readily drawn together.

Signed at Chicago, this 18th day of January, 1918.

WILLIAM BARTHOLOMEW.

Witnesses:
J. W. GRIFFEN,
CHAS. L. BYRON.